United States Patent
Kollipara et al.

(10) Patent No.: US 10,177,964 B2
(45) Date of Patent: Jan. 8, 2019

(54) SYSTEM AND METHOD FOR ACCURATE REPORTING OF FAULT FOR FAILED INTERNET PROTOCOL-BASED CALLS

(71) Applicant: NetScout Systems, Inc, Westford, MA (US)

(72) Inventors: Anilkumar Kollipara, Allen, TX (US); James E. Wilson, Richardson, TX (US)

(73) Assignee: NetScout Systems, Inc, Westford, MA (US)

( * ) Notice: Subject to any disclaimer, the term of this patent is extended or adjusted under 35 U.S.C. 154(b) by 70 days.

(21) Appl. No.: 15/491,665

(22) Filed: Apr. 19, 2017

(65) Prior Publication Data

US 2018/0309616 A1    Oct. 25, 2018

(51) Int. Cl.
| | |
|---|---|
| H04L 1/00 | (2006.01) |
| H04L 12/24 | (2006.01) |
| H04M 3/22 | (2006.01) |
| H04W 24/08 | (2009.01) |
| H04L 29/06 | (2006.01) |

(52) U.S. Cl.
CPC ...... *H04L 41/0631* (2013.01); *H04M 3/2218* (2013.01); *H04W 24/08* (2013.01); *H04L 65/1006* (2013.01); *H04L 65/608* (2013.01)

(58) Field of Classification Search
CPC ............... H04L 41/0631; H04L 65/608; H04L 65/1006; H04M 3/2218; H04W 24/08
See application file for complete search history.

(56) References Cited

U.S. PATENT DOCUMENTS

| | | | | |
|---|---|---|---|---|
| 2010/0128860 | A1* | 5/2010 | Kung | ...................... H04L 43/16 379/112.01 |
| 2011/0013763 | A1* | 1/2011 | Dube | .................. H04M 3/2281 379/189 |
| 2011/0122773 | A1* | 5/2011 | Kung | .................. H04L 41/0631 370/241 |
| 2014/0211787 | A1* | 7/2014 | Noldus | ............... H04L 65/1083 370/352 |

OTHER PUBLICATIONS

Extended European Search Report for European Patent Application No. 18166877.3, dated Jun. 20, 2018.

* cited by examiner

*Primary Examiner* — Clemence S Han
(74) *Attorney, Agent, or Firm* — Locke Lord LLP; Scott D. Wofsy; Christopher J. Capelli

(57) ABSTRACT

A system and method to identify a call end associated with a problem that caused failure of an internet protocol-based call. The method includes accessing a first call detail record (CDR) set including at least one CDR associated with a first call end of the failed call, determining from the first CDR set indicators of failure attribution of the failed call, determining whether fault for failure of the failed call is attributed to the first call end based on the indicators of failure attribution; outputting an indication that the fault is attributed to the first call end if it was determined that the fault is attributed to the first call end, and outputting the indication to indicate the first call end is acquitted of the fault if it was determined the fault is not attributed to the first call end.

15 Claims, 4 Drawing Sheets

SYSTEM AND METHOD FOR ACCURATE REPORTING OF FAULT FOR FAILED INTERNET PROTOCOL-BASED CALLS

FIELD OF THE INVENTION

The present technology relates to network monitoring and, more particularly, methods and systems for accurate reporting of fault for failed internet protocol-based calls.

BACKGROUND OF THE INVENTION

Network analysis includes monitoring different call ends of a conversation and generating performance statistics, including key performance indicators (KPIs), about network performance. Since call failures directly impact end customers and constitute a major factor in customer churn, call failure rate is one of the most important KPIs monitored by a service provider. Considerable amounts of time and money are spent to ensure that call failures are addressed and resolved in a timely fashion.

However, current monitoring solutions monitor different call ends of a conversation separately, treating the different call ends as different respective calls. KPIs, cause codes, and events are reported separately for each of these call ends. As a result, when a call fails, a cause code is attributed to each call end of the call. In a scenario in which each call end of the call is attributed with a failure cause code, both call ends can be penalized, although only one call end was actually at fault. In consequence, performance statistics can be skewed by duplicated attribution of fault for call failures, creating false positives and confusing plans to resolve a cause for the call failure. This can result in an increased mean time to repair (MTTR) that affects customer experience and increases operation costs for the service supplier.

For example, during a conversation between an LTE mobile device A (e.g., voice over LTE (VoLTE)) and a Wi-Fi mobile device B, the Wi-Fi mobile device B may begin to experience poor quality due to increased congestion on its Wi-Fi network. As a result, the call may fail on the Wi-Fi network, such as in conjunction with a real-time transport protocol (RTP) timeout cause code. This call failure may be observed on the LTE mobile device A's LTE network as well, in conjunction with the same RTP Timeout cause code, all while the LTE network maintained a good connection. A network performance engineer may spend a considerable amount of time investigating this call failure on the LTE network, only to find out that the call failure was unrelated to the LTE network, but was due to poor Wi-Fi network connections on the other side of the conversation, which typically is not actionable.

In addition, the poor Wi-Fi connection at Wi-Fi mobile device B can introduce media gaps on the uplink side. However, these media gaps would also be reported for the downlink side of the LTE mobile device A. A network performance engineer may spend a considerable amount of time investigating these media gaps on the LTE network, only to find out that the media gaps were due to poor Wi-Fi network connections on the other side of the conversation, which again is typically not actionable.

Such conventional methods and systems have generally been considered satisfactory for their intended purpose. However, there is still a need in the art for non-duplicated, accurate attribution of fault for call failure and poor network performance.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a computer implemented method to identify a call end associated with a problem that caused failure of an internet protocol-based call. The method includes accessing a first call detail record (CDR) set including at least one CDR associated with a first call end of the failed call, determining from the first CDR set indicators of failure attribution of the failed call, determining whether fault for failure of the failed call is attributed to the first call end based on the indicators of failure attribution; outputting an indication that the fault is attributed to the first call end if it was determined that the fault is attributed to the first call end, and outputting the indication to indicate the first call end is acquitted of the fault if it was determined the fault is not attributed to the first call end.

In accordance with another aspect of the disclosure, a system is provided to identify a call end associated with a problem that caused failure of an internet protocol-based call. The system includes a memory configured to store instructions and a processor disposed in communication with the memory. The processor upon execution of the instructions is configured to perform the operations of the method.

In accordance with still another aspect of the disclosure, a non-transitory computer readable storage medium and one or more computer programs embedded therein are provided. The computer programs include instructions, which when executed by a computer system, cause the computer system to perform the operations of the method.

BRIEF DESCRIPTION OF THE DRAWINGS

The accompanying appendices and/or drawings illustrate various non limiting, example, inventive aspects in accordance with the present disclosure.

DETAILED DESCRIPTION OF CERTAIN EMBODIMENTS

Figure 1:
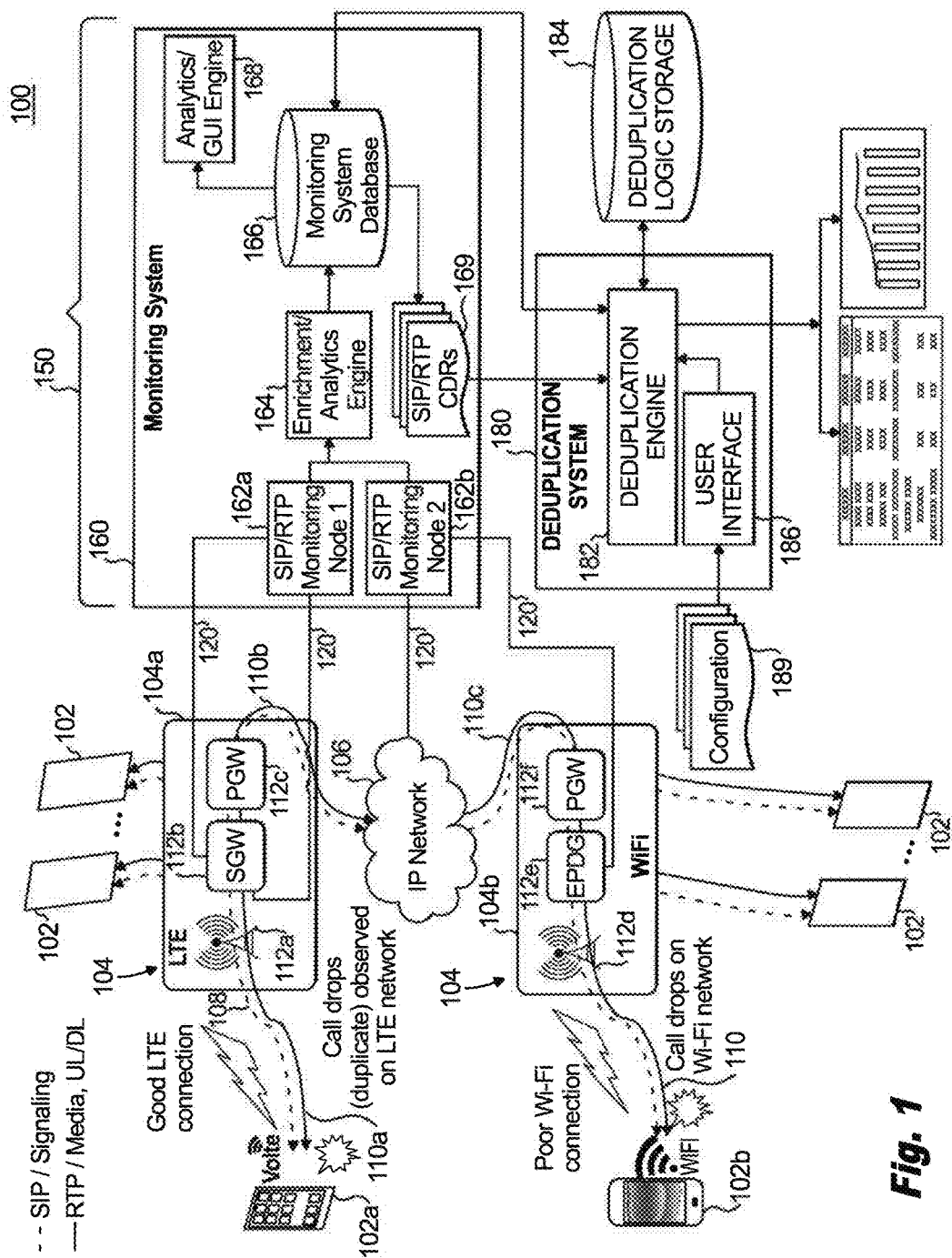
FIG. 1 illustrates an example communication system.

Reference will now be made to the drawings wherein like reference numerals identify similar structural features or aspects of the subject disclosure. For purposes of explanation and illustration, and not limitation, a block diagram of an exemplary embodiment of a network analytics system in accordance with the disclosure is shown in FIG. 1 and is designated generally by reference character 100. Other embodiments of the network analytics system 100 in accordance with the disclosure, or aspects thereof, are provided in FIGS. 2-4, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

In traditional communication systems, when a call between two call ends fails, monitoring solutions monitor the two call ends separately, treating the two call ends as two respective, separate calls. When a call between the two call ends has failed, each call end may receive a cause code. In a scenario in which both call ends received a failure cause code, both call ends may be penalized for the failed call, although only one call end of the call was actually at fault. Thus, ascription of fault is duplicated and inaccurate, distorting performance statistics, increasing false positives, and increasing mean time to repair.

In the disclosed system and method, a deduplication monitoring system monitors information output by the communication systems that serviced at least one call end of the call and applies deduplication logic to ascribe fault to only one call end of the call. The other call end of the call is acquitted of fault. Accordingly, blame for a failed call is not duplicated. The deduplication monitoring system can generate accurate output data regarding failed calls without duplication of blame for these failed calls. The output data can be displayed, e.g., graphically via a graphical user interface (GUI), and/or provided to an analysis engine for further analysis.

Description of certain illustrated embodiments of the present disclosure will now be provided. With reference now to FIG. 1, a communication system 100 is shown in which end user devices 102 are each coupled to a communication system 104, wherein multiple communication systems 104 can communicate with one another via an Internet protocol network 106. Two or more devices 102 communicating with one another can use the same communication system 104 or different respective communication systems 104. The communication can include streaming media, such as telephony, video teleconference applications, television services, and web-based push-to-talk features.

A signaling protocol, such as the Session Initiation Protocol (SIP), can be used to establish connections across the IP network 106, whereas a media protocol, such as real-time transport protocol (RTP) can be used to facilitate the exchange of media for carrying media (e.g., audio and video) streams. Media paths are represented by the solid lines 110 (including example solid lines 110a-c). The monitoring system 160 can analyze media protocol packets (e.g., RTP packets) and/or control protocol packets (e.g., RTP Control Protocol (RTCP) packets), without limitation to a particular signaling or media protocol. Other protocol examples include, without limitation to a particular protocol or version of the protocol, SIP-EoCQ, RTCP-XR, general packet radio service (GPRS) Tunneling Protocol (GTP), Diameter, and S1 Application Part (S1AP) protocols.

The devices 102 can include particular devices, such as devices 102a and 102b, and the communication systems 104 can include particular communication systems 104a and 104b. In the example shown in FIG. 1, device 102a receives service from communication system 104a, and device 102b receives service from communication system 104b. The devices 102 can include, for example, mobile computing devices, smart phones, smart devices (e.g., Internet-capable devices), servers, media servers, stationary computing devices, and smart sensors (e.g., Internet-capable sensors).

The communication systems 104 can each provide communication services to many devices 102. Each communication system 104 can provide one or more different standards and technologies, such as 3G, 4G, LTE or voice over (Vo) LTE that exchange data via a cellular network and Wi-Fi that uses radio waves to provide network connectivity independent of cellular networks. A communication system 104 can be integrated with or independent from a service provider.

In the example shown, device 102a uses VoLTE technology via an LTE communication system 104a, the LTE communication system 104a having internal components 112a, b, c. Device 102a communicates with device 102b that uses Wi-Fi via Wi-Fi communication system 104b. As shown, the Wi-Fi communication system 104b contains some components that are independent of cellular networks, such as radio and/or airwaves, while some components, such as internal components 112e and 112f, belong to a service provider's core network. It is noted that the disclosure also encompasses a Wi-Fi communication system 104b that is an independent communication system which is independent of a service provider.

The communication systems 104a and 104b facilitate communication between devices 102a and 102b by exchanging signals and data via the IP network 106. The IP network 106 is an IP capable network, such as an IP-based multimedia services (IMS) network. In embodiments, the network 106 can facilitate the use of IP for packet communications in a variety of standards over wireless or landline communication links. The network 106 can provide IP transport in a core network and a radio access network (such as Universal Terrestrial Radio Access Network (UTRAN) or extended (E-) UTRAN) to enable convergence of data, speech, and mobile network technology over an IP-based infrastructure. In embodiments, the network 106 provides end-to-end IP services to devices 102a and 102b.

The network 106 can include, for example, one or more networks, including an internet protocol (IP) network. Thus network 106 can include one or more of networks, such as the Internet, a private network, a different public network, a cellular network, a personal communication service (PCS) network, a public switched telephone network (PSTN), a wired network, a wireless network, etc.

In the example shown in FIG. 1, communication is established between devices 102a and 102b via respective s communication systems 104a and 104b using SIP signaling, as indicated by dotted line 108, and RTP media uplinks and media downlinks, as indicated by solid line 110. In FIG. 1 the call has two sides. One side includes device 102a and its communication system 104a, and the other side includes device 102b and its communication system. The SIP signaling and RTP media uplinks and downlinks can be facilitated across one or more communication links, which can include wireless of wired communication links, or a combination thereof.

The media paths 110a, 110b, and 110c are shown in FIG. 1 as logical representations of media path legs. In a physical communication system, there can be many media path legs depending upon how the media path is setup and how packets are routed through various network elements. From a service perspective, each call can have multiple media sessions (such for a voice and video call), and each media session (e.g., using RTP) can have an uplink and a downlink, meaning when user A is talking via device 102a to user B via device 102b, an uplink is provided for user A and a downlink is provided for user B, and vice-versa. In the example shown, device 102b experienced a poor Wi-Fi connection after a call was established and the call had failed from the Wi-Fi network established by the Wi-Fi service provider system 104b. The term "call" as used throughout the disclosure refers to a communication that uses Internet protocol (IP), which can include transmission of voice and other media (SMS messages, graphics, photos, video, audio, etc.) using IP.

In the scenario shown in FIG. 1, both ends of the call use IP (including the originator or calling end and the receiver or called end). In other scenarios, IP can be used at only one end of the call. For example, one of devices 102a and 102b can be a telephone that uses a landline that provides plain old telephone service (POTS) or a cellular phone without internet capabilities. The corresponding communication system 104a or 104b can be, for example, a PSN that uses time division multiplexing (TDM) technology instead of IP and communicates through a PSTN network or Private Branch Exchange (PBX) of network 106.

In the example shown, device 102a maintained a good LTE connection throughout the call, however once the call failed, the device 102a lost communication with device 102b. The LTE communication system 104a observed that the call had failed from its LTE network.

In a traditional monitoring system, both call ends of the failed call, including a first call end that includes device 102a using LTE communication system 104a and a second call end that includes device 102b using Wi-Fi communication system 104b, may have received a failure cause code, and both call ends may be penalized for the failed call. Thus, although only one call end of the call was actually at fault, ascription of fault can be duplicated and inaccurate.

In the disclosed communication system 100 shown in FIG. 1, a deduplication monitoring system 150 is provided that monitors information output by the LTE service communication system 104a, the Wi-Fi communication system 104b and/or the IP network 106, ascribes fault for failed calls to only one of the first or second call end of the call, and updates logged information about failed calls with fault ascribed to only the faulty call end of the call, while the other call end of the call being is acquitted of fault. Accordingly, blame for a failed call is not duplicated. Output data that indicates ascription of fault to only one call end of the call can be displayed, e.g., graphically via a graphical user interface (GUI), and/or provided to an analysis engine for further analysis.

The deduplication monitoring system 150 includes a monitoring system 160 and a deduplication system 180. The monitoring system 160 includes one or more monitoring nodes 162, such as first and second monitoring nodes 162a, 162. Each monitoring node 162 can receive monitored data via communication links 120 from one or more service provider systems, such as LTE communication system 104a or Wi-Fi service communication system 104b. Additionally, the monitoring nodes 162 can receive monitored data from the IP network 106. Each monitoring node 162 can be capable of handling multiple protocols and technologies. So communication system 104a and 104b can both be configured to communicate with the same or different monitoring nodes 162. Each monitoring node 162 can be configured to receive monitored data that is associated with a single call end of a call or with multiple call ends of the call. The monitored data includes signal and media data, such as SIP, RTP, and/or RTCP data, without limitation to a specific signal or media data.

In a first scenario described in greater detail below, monitored data associated with only one call end of a call is provided via one or more communication links 120 to one monitoring node 162, such as first monitoring node 162a or second monitoring node 162b. The monitored data is provided by the communication system 104 associated with the call end of the call, such as one of the first or second call ends of the call. Additionally, monitored data can be provided by the IP network 106. In the example shown, in the first scenario, monitored data is provided by either the LTE communication system 104a to the first monitoring node 162a or by the Wi-Fi communication system 104b to the second monitoring node 162b.

In a second scenario described in greater detail below, monitored data associated with all call ends of a call is provided via communication links 120 to respective monitoring nodes 160. The call can be a two-way call that has two call ends, or a multiple-ended call, such as a conference call, that has two or more call ends. The monitored data is provided by the communication systems 104 associated with two or more respective call ends of the call. Additionally, monitored data can be provided by the IP network 106. In the example shown, in the second scenario, monitored data is provided by the LTE communication systems 104a handling one call end of the call to the first monitoring node 162a and by the Wi-Fi communication system 104b, handling the other call end (or another call end, in the case of a conference all) of the call, to the second monitoring node 162b.

In the LTE communication system 104a, monitored data is collected by components 112b and/or 112c of an LTE network supported by the LTE communication system 104a. In the Wi-Fi communication system 104b, monitored data is collected by components 112e and/or 112f of a Wi-Fi network, which can be independent of or supported by the Wi-Fi communication system 104b. Collection of monitored data can be performed by central or distributed monitoring devices (not shown), which can include software, firmware, and/or hardware components, such as taps, probes, or port mirrors that can be positioned inline along communication links of the LTE network or the Wi-Fi network, or integrated with network devices of the LTE network or Wi-Fi network. In embodiments, the monitoring devices can be physical devices that may be collocated or remote with respect to devices 102, communication systems 104 and network(s) 106. In embodiments, the monitoring devices can include software modules, which can include software agents, or can be virtual devices that are remote relative to devices 102a, 102b, server components and/or communication links of the LTE or Wi-Fi networks. The monitored data collected by the monitoring node 162 in the first scenario, or by the different monitoring nodes 162 in the second scenario, is accessed by enrichment/analytics engine 164. The term "accessing" refers to one or more of reading, copying, retrieving, receiving a transmission with or without requesting the transmission, or otherwise obtaining.

The enrichment/analytics engine 164 extracts data from signaling and media messages from the monitored data and stores the extracted data in a monitoring system database 166 and generates call detail records (CDRs) associating with either or both of the call ends of the call being monitored by one or more monitoring nodes 162.

The CDRs can include information from, or complete, signaling protocol messages (e.g., SIP) or transport protocol (e.g., RTP) messages, without limitation to a specific protocol. The messages can include, for example, request and response (also known as status) messages), RTP messages, RTCP messages (e.g., sender report (SR), receiver report (RR), source description (SDES), goodbye (BYE), and/or application-specific message (APP) for different applications used).

Information included in the CDRs can include cause codes that indicate a cause for a call termination or failure, details about termination messages, phone number of the associated party, a synchronous source identifier (SSRC), an international mobile subscriber identity (IMSI), a call start time, and/or call performance data. The cause codes can be cause codes as defined by respective protocols (such as SIP or RTP, without limitation to a particular cause code), or inferred cause codes determined using logic. The call performance data can include, for example, a mean opinion score, packet loss data, jitter data, and a quality of experience measurement. The quality of experience measurement can include gap count, gap length, gap duration ratio, and/or one-way media delay associated with one or more uplink or downlink media path legs.

An analytics/GUI engine 168 accesses data stored in the monitoring system database 166 and performs analysis, which can include generating a graphical display of analytic results that can be displayed by a GUI.

The deduplication system 180 includes a deduplication engine 182 and a user interface 186. The deduplication engine 182 applies deduplication logic. The deduplication logic can be incorporated into the deduplication engine 182 and/or stored in a deduplication storage 184 and accessed by the deduplication engine 182. A user can enter configuration information 189 via the user interface 186 to configure the deduplication engine 182. The deduplication engine 182 accesses CDRs 169 that include session initiation and media signaling parameters associated with one or more of the call ends. Session initiation signaling parameters can be included, for example, in SIP CDRs, and media signaling parameters can be included in RTP CDRs. The deduplication logic is applied to determine a call end of a failed call that is at fault for failure of the failed call. The term "failed call," as used throughout the disclosure, refers to a call that was terminated without successful completion. A failed call can be a call that was not successfully setup, or a call that was successfully setup but with poor media quality and then terminated by user request, or a call that was successfully setup and then is terminated by the network due to RF, quality, or signaling issues. The call can fail due to a problem associated with one of the call ends, for example, a poor Wi-Fi connection, a poor Internet connection, a fault in the network, a fault in one or more nodes or one or more node types, high call volume, low network capacity to handle call volume, network coverage, and/or a poor signal.

In a first scenario in which CDRs for both originator and terminating call ends of a call can be accessed, the CDRs for the originator and terminating call ends are correlated. The first scenario may occur, for example, when the monitoring system 160 receives CDRs from both the communication systems 104 handling communication with the respective originator and terminating call ends 102. This first scenario may occur, for example when the same corporate entity controls the communication systems 104 handling communication with both of the originator and terminating call ends 102, or there is collaboration between the corporate entity controlling the monitoring system 160 and both corporate entities handling communication with the respective originator and terminating call ends 102.

In an example, the deduplication engine 182 can correlate CDRs 169 associated with a single call between an originator call end that originated the call and a receiver call end that received the call. Specifically, correlation is performed between originating CDRs of CDRs 169 that are associated with the originator call end and terminating CDRs of CDRs 169 that are associated with the terminating call end.

Correlating these CDRs is performed using one or more of the following operations: using SIP signaling parameters included in SIP CDRs of CDRs 169 to match a calling number (which indicates a phone number of the originator call end) to a called number (which indicates a phone number of the terminating call end); using the SIP signaling parameters and RTP signaling parameters to match an originating RTP CDR of the CDRs 169 to an originating SIP CDR of the CDRs 169; using the SIP and RTP signaling parameters to match a terminating RTP CDR of the CDRs 169 to a terminating SIP CDR of the CDRs 169; using the RTP signaling parameters to match an RTP CDR of the CDRs 169 that is associated with the originator call end to an RTP CDR of the CDRs 169 that is associated with the terminating call end by determining whether a mobile originating uplink SSRC=mobile terminating downlink SSRC, and determining whether a mobile originating downlink SSRC=mobile terminating uplink SSRC; and using at least one of the SIP and RTP signaling parameters to determine whether the originating and terminating CDRs use different IMSIs; and using at least one of SIP and RTP signaling parameters to determine whether a difference between start times for the failed call indicated in the originating and terminating CDRs is less than a configurable time period (e.g., ten seconds). When a call includes a plurality of terminating call ends, such as for a conference call, CDRs associated with the originating call end and the terminating call end, and any other participating ends, are correlated to one another. For example, callers A, B, and C participate in a call, in which A calls B and B decides to add C. If B leaves the conference call due to a failed call, then both the calls of both A and C fail. If C leaves the conference call due to a failed call, then both the calls of A and B fail. However, if A leaves the conference call due to a failed call, then B and C can both continue the call.

Indicators of failure attribution are determined in the correlated CDRs. Indicators of failure attribution that can be detected in the correlated CDRs can include, for example, a direction of a call termination message, cause codes (wherein the cause codes are defined by a protocol, such as SIP or RTP, without limitation to a particular protocol and/or inferred cause codes), and an indication included in the CDRs of the originating and/or terminating call ends that the failed call ended unexpectedly.

In addition, the deduplication engine 182 applies deduplication logic to the determined indicators of failure attribution to attribute one of the call ends with fault and acquit the other call end(s) of fault. The deduplication logic can be stored in a deduplication data structure, e.g., a table in the deduplication logic storage 184. The depulication data structure can store failure rankings of cause codes. Inferred cause codes can be ranked relative to the cause codes that are defined by a protocol. The failure rankings can represent the degree to which the corresponding cause codes affect customer experience or are likely to affect customer experience. In the present example, a higher failure ranking represents a higher degree or likelihood of affecting customer experience.

In embodiments, the deduplication structure stores rules. The rules can include tie-breaking rules that are based on conditions. In embodiments at least a portion of the rules are incorporated into the deduplication engine 182. In embodiments at least a portion of the rules are stored in the deduplication structure and accessed by the deduplication engine 182.

When different respective cause codes are associated with the originator call end and the terminating call end, the deduplication engine 182 applies a rule of the deduplication logic that attributes fault to the call end having a cause code that has a higher failure ranking than the other cause code(s), representing a worse customer experience than the other call end(s). In embodiments, the rule takes into consideration the direction of the call termination message and an indication that the call ended unexpectedly. The failure rankings can be determined by consulting the deduplication data structure.

The tie-breaking rules are applied by the deduplication engine 182 to determine the call end that is having the worst customer experience relative to the other call end(s) based on conditions. The conditions can include, for example, one or more of direction of a call termination message, indication that a call terminated unexpectedly, and call performance data. The call performance data can include, for example, one or more of mean opinion score, packet loss, jitter, and a quality of experience measurement. The quality of experience measurement can include, for example, one or more of gap count, gap length, gap duration ratio, gaps rate, one-way media, and delay of one or more of the uplink and downlink on one or more media path legs.

Attribution of fault to a call end refers to attributing fault for a failed call to a call end that is associated with a problem that caused the call failure. For example, a call end that lost a Wi-Fi signal, which may be caused, for example, by local signal interference or inadequate signal hand-off coverage, can be attributed with fault for the call failure. When the originator and terminating call ends have the same cause codes, then tie-breaking logic is applied in which other data in the CDRs and/or call performance data associated with the respective originator is compared to determine which call end should be attributed with fault. The other data in the CDRs can include, for example, direction of a call termination request, which indicates which call end decided to terminate the call. When a call end is attributed with fault, the call end is determined to be associated with a problem that caused the call failure.

The configuration data 189, which can be entered by a user via the user interface 186, or by another processing device (not shown), can configure the deduplication logic. Configuration of the deduplication logic can include, for example, selecting rules from a set of available rules; entering new rules; establishing failure rankings of cause codes; establishing tie-breaking rules, including failure rankings of conditions, wherein the conditions include other data in the CDRs, performance data, or combinations of other data in the CDRs and/or performance data.

In a second scenario in which CDRs for only one of the originator and terminating call ends of a call can be accessed, then indicators of failure attribution are determined from the CDRs accessed. This second scenario may occur, for example when the different corporate entities control the communication systems 104 handling communication from the respective originator and terminating call ends 102 and there is not collaboration between the different corporate entities. The monitoring system 160 communicates with only one of these communication systems 104 and thus can access CDRs and call performance data for only one of the call ends.

The deduplication logic is applied to determine indicators of failure attribution and/or conditions associated with the call end for which CDRs and performance data are accessible. The deduplication logic applied includes rules that determine whether the indicators of failure attribution and/or condition indicate that the associated call end should be attributed with fault for the failed call's failure. The conditions can include, for example, whether the accessed CDRs include a call termination message, whether there is an indication that a call terminated unexpectedly, and call performance data associated with the call end.

An example rule attributes fault to the other call end for which CDR and performance data are not accessible when the indicators of failure attribution and/or conditions determined represent a very good customer experience such that a failed call would not be expected. On the other hand, when the indicators of failure attribution and/or conditions determined represent a poor customer experience such that a failed call would be likely, an example rule would attribute fault to the call end for which CDR and performance data are accessible.

Only one call end is attributed with fault for a failed call. Once a call end is attributed with fault, the other call end(s) are acquitted of fault. Similarly, once a call end is acquitted of fault, the other call end (if there are only two call ends) can be attributed with fault. The deduplication engine 182 updates the monitoring system database 166 with the determinations of fault and/or acquittal. In addition, the deduplication engine 182 can analyze results of the determinations of fault and/or acquittal and/or generate reports based on the determinations of fault, acquittal, and/or analysis. The reports can include graphical displays that can be displayed by a GUI.

The deduplication engine 182 and the user interface 186 can be configured as one or more software modules that can be separate, combined, or share one or more software components. Additionally, the deduplication logic storage 184 can be located remotely from the deduplication system 180. Alternatively, the deduplication logic storage 184 can be co-located with, or embodied in, the deduplication system 180. The deduplication logic storage 184 can include one or more storage mediums, such as a disk, RAM, flash memory, etc. Additionally, the deduplication logic storage 184 can include a database, which can include database management software for managing the database.

The monitoring system 160 can be a traditional monitoring system that processes each call end separately, evaluates the cause codes associated with each call end separately, and determines fault for a call failure for each call end separately based on the evaluation of the call end's cause codes. The monitoring system 160 thus may initially attribute fault to more than one call end of the failed call, and store the duplicate fault attribution information in the monitoring system database 166.

The deduplication system 180 can update the monitoring system database 166 with a determination that a single call end of the failed call is attributed with fault for failure of the failed call, and further determine that the other call end(s) should be acquitted. The deduplication engine 182 can update the monitoring system database 166 to undo duplicate fault attribution for a single call failure by storing an acquittal of fault for each call end that was determined to be acquitted of fault.

The deduplication system 180 can be located remotely from the monitoring system 160. Alternatively, the deduplication system 180 can be co-located with, or embodied in, the monitoring system 160.

Each of the deduplication system 180 and monitoring system 160 may be a special purpose computing device or a software component (not limited to a single process) dedicated to monitoring monitored data of a communication network and determining which call end of a failed call is at fault for the call failure, while acquitting the other call end(s). Alternatively, the deduplication system 180 and monitoring system 160 may each be a general purpose computing device with specialized software components installed thereon. In one embodiment, one or more of the monitoring system 160 and the deduplication system 180 is embodied as a monitoring system available from NetScout Systems, Inc. of Westford, Mass., such as IrisView, Iris Performance Intelligence, InfinitiStream, InfinitiStreamNG, or nGeniusONE, or a monitoring system that may be developed in the future.

The deduplication storage 184 can be located remotely from the deduplication system 180. Alternatively, the deduplication storage 184 can be co-located with, or embodied in, the deduplication system 180.

Figure 2:
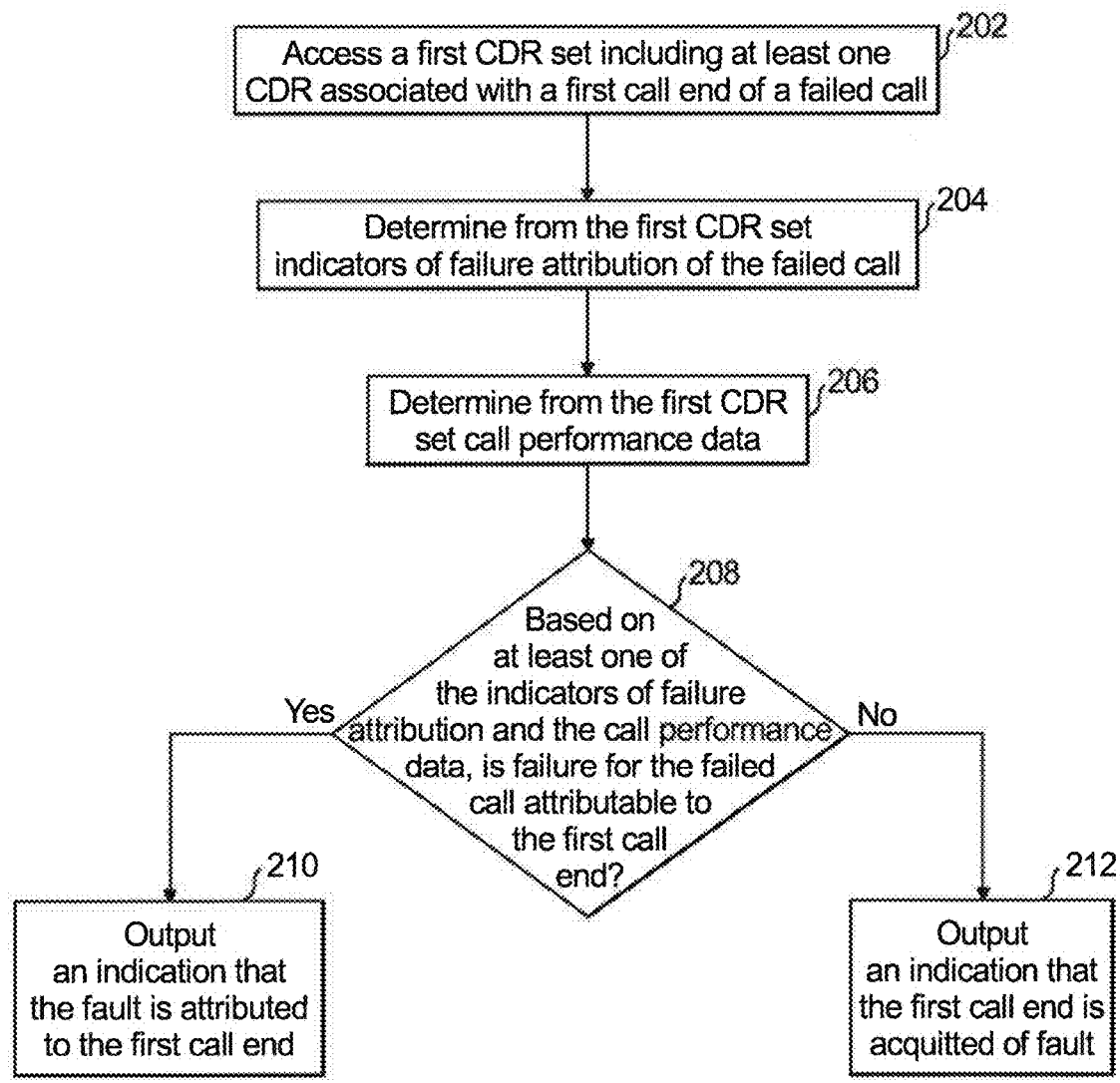
FIG. 2 illustrates a flowchart of an example method for deduplication of reported fault for failed internet protocol-based calls in accordance with an illustrative embodiment of the present disclosure in one scenario.
Figure 3:
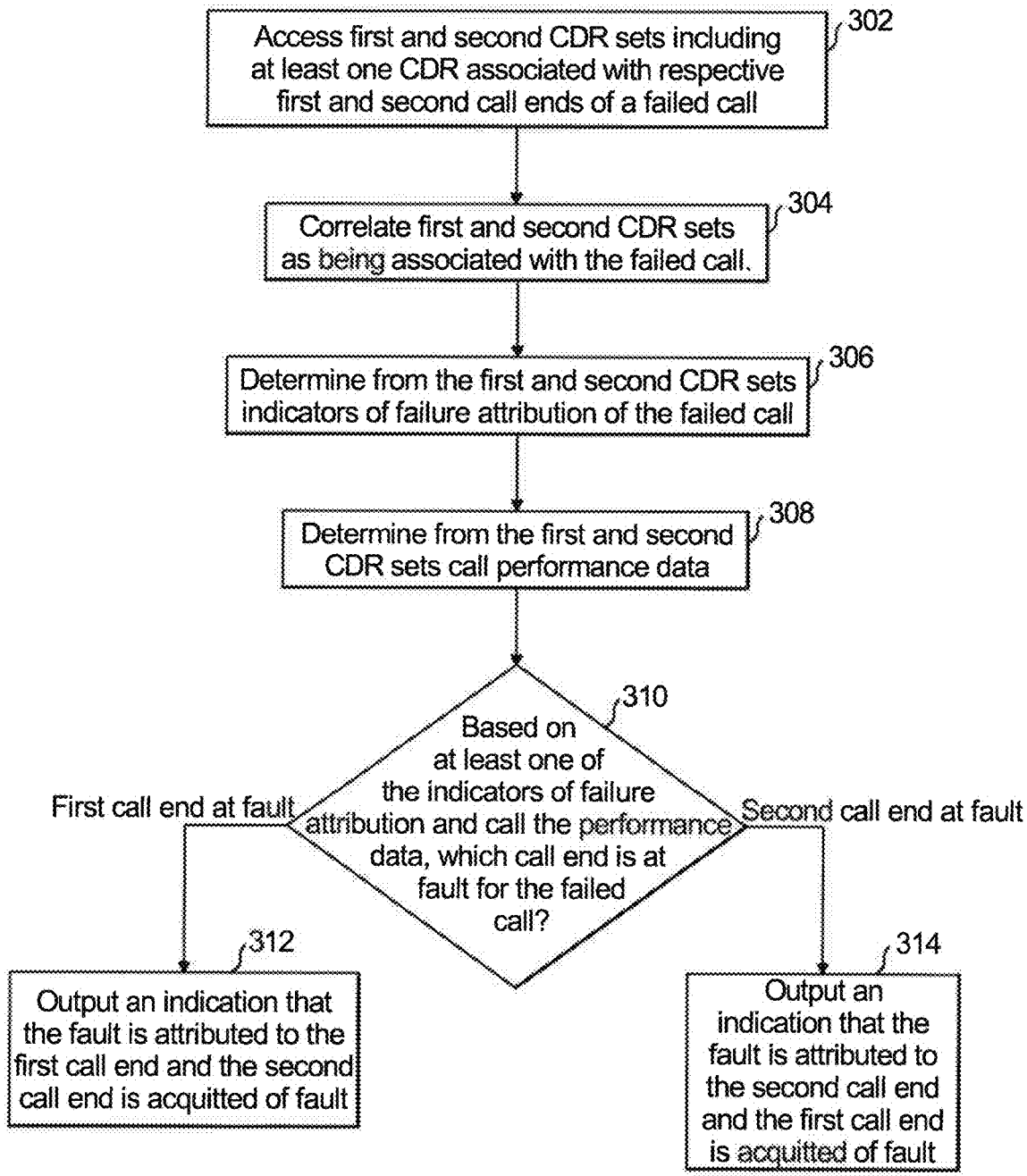
FIG. 3 illustrates a flowchart of an example method for deduplication of reported fault for failed internet protocol-based calls in accordance with an illustrative embodiment of the present disclosure in a different scenario than shown in FIG. 2.

With reference now to FIGS. 2 and 3, shown is a flowchart demonstrating implementation in the first and second scenarios described above in various exemplary embodiments. It is noted that the order of operations shown in FIGS. 2 and 3 is not required, so in principle, the various operations may be performed out of the illustrated order. Also certain operations may be skipped, different operations may be added or substituted, or selected operations or groups of operations may be performed in a separate application following the embodiments described herein.

Regarding FIG. 2, operations performed in association with the second scenario described above are shown. At operation 202, a first CDR set including at least one CDR associated with a first call end of a failed call is accessed. At operation 204 indicators of failure attribution of the failed call are determined from the first CDR set. At operation 206, call performance data indicative of customer experience is determined from the first CDR set.

At operation 208, a determination is made, based on at least one of the indicators of failure attribution and the call performance data, whether fault for failure of the failed call is attributable to the first call end. The determination at operation 208 is performed using deduplication logic. At operation 210, if the determination at operation 208 was YES, then an indication is output that the fault is attributed to the first call end. At operation 212, if the determination at operation 208 was NO, then an indication is output that the first call end is acquitted of fault. The indication output at operations 210 and 212 can include displaying the information, e.g., graphically via a GUI, sending the indication to another processing device, and/or updating the monitoring system database 166, which removes duplicate attribution of fault to different call ends of a failed call.

Regarding FIG. 3, operations performed in association with the first scenario described above are shown. At operation 302, a first CDR set including at least one CDR associated with a first call end of a failed call and a second CDR set including at least one CDR associated with a second call end of the failed call are accessed. At operation 304, the first and seconds CDR sets are correlated as being associated with the failed call. At operation 306 indicators of failure attribution of the failed call are determined from the respective first and second CDR sets. At operation 308, call performance data indicative of customer experience is determined from the respective first and second CDR sets.

At operation 310, a determination is made, based on at least one of the indicators of failure attribution and the call performance data, whether fault is attributed to the first call end or the second call end. The determination at operation 310 is performed using deduplication logic. At operation 312, if the determination at operation 310 was that the first call end is attributed with fault, then output an indication that fault is attributed to the first call end and that the second call end is acquitted of fault. At operation 314, if the determination at operation 310 was that the second call end is attributed with fault, then output an indication that fault is attributed to the second call end and that the first call end is acquitted of fault. The indications output at operations 312 and 314 can include displaying the information, e.g., graphically via a GUI, sending the indication to another processing device, and/or updating the monitoring system database 166, which removes duplicate attribution of fault to different call ends of a failed call.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the deduplication system 180 or monitoring system 160 may be implemented or executed by one or more computer systems. For example, deduplication system 180 or monitoring system 160 can be implemented using a computer system such as example computer system 402 illustrated in FIG. 4. In various embodiments, computer system 402 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 402 is only one example of a suitable system and is not intended to suggest any limitation as to the scope of use or functionality of embodiments of the disclosure described herein. Regardless, computer system 402 is capable of being implemented and/or performing any of the functionality set forth hereinabove.

Computer system 402 may be described in the general context of computer system-executable instructions, such as program modules, being executed by a computer system. Generally, program modules may include routines, programs, objects, components, logic, data structures, and so on that perform particular tasks or implement particular abstract data types. Computer system 402 may be practiced in distributed data processing environments where tasks are performed by remote processing devices that are linked through a communications network. In a distributed data processing environment, program modules may be located in both local and remote computer system storage media including memory storage devices.

Figure 4:
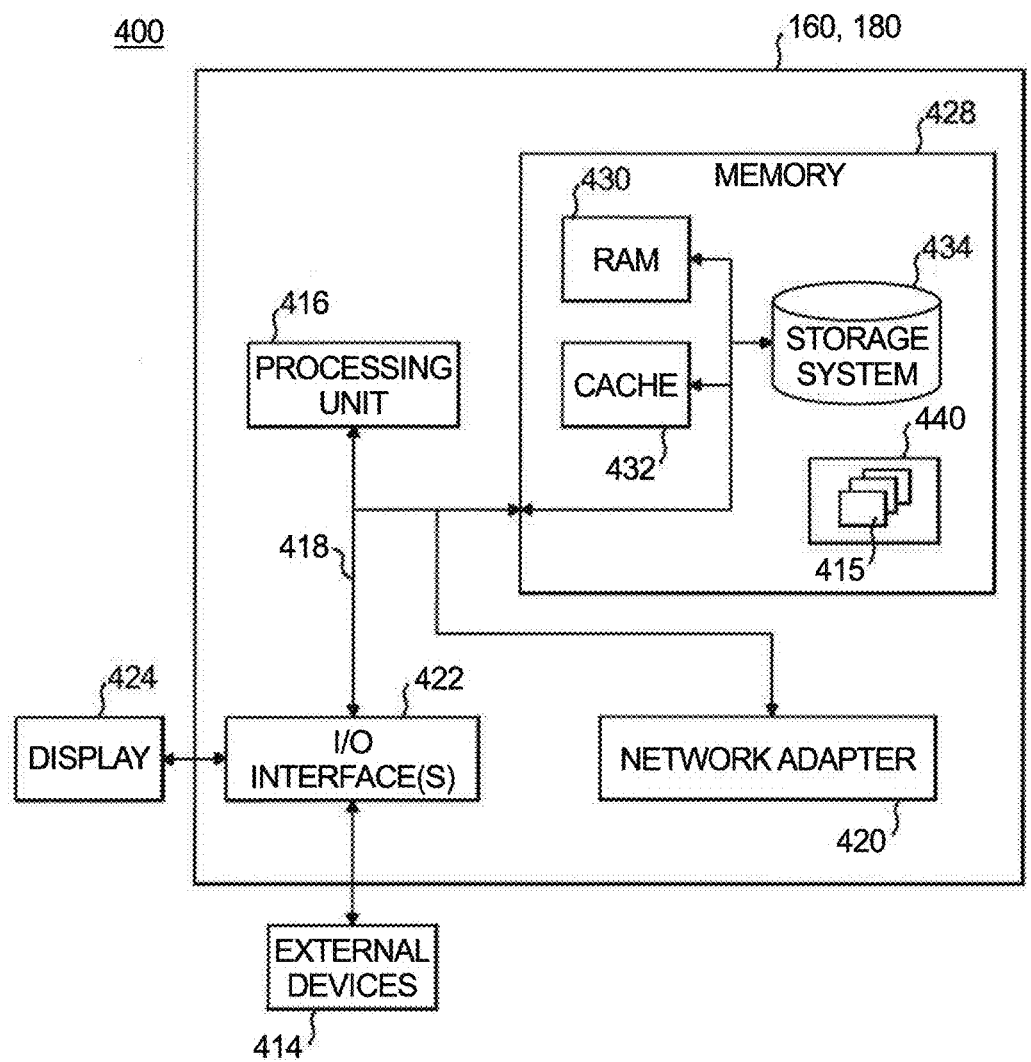
FIG. 4 illustrates a schematic block diagram of an example packet monitor or packet analysis system, in accordance with an illustrative embodiment of the present disclosure.

Computer system 402 is shown in FIG. 4 in the form of a general-purpose computing device. The components of computer system 402 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 402 typically includes a variety of computer system readable media. Such media may be any available media that is accessible by network management server 104, and it includes both volatile and non-volatile media, removable and non-removable media.

System memory 428 can include computer system readable media in the form of volatile memory, such as random access memory (RAM) 430 and/or cache memory 432. Computer system 402 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the disclosure.

Program/utility 440, having a set (at least one) of program modules 415, such as computer system 402, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 415 generally carry out the functions and/or methodologies of embodiments of the disclosure as described herein.

Computer system 402 may also communicate with one or more external devices 414 such as a keyboard, a pointing device, a display 424, etc.; one or more devices that enable a user to interact with computer system 402; and/or any devices (e.g., network card, modem, etc.) that enable network management server 104 to communicate with one or more other computing devices. Such communication can occur via Input/Output (I/O) interfaces 422. Still yet, computer system 402 can communicate with one or more networks such as a local area network (LAN), a general wide area network (WAN), and/or a public network (e.g., the Internet) via network adapter 420. As depicted, network adapter 420 communicates with the other components of network management server 104 via bus 418. It should be understood that although not shown, other hardware and/or software components could be used in conjunction with computer system 402. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the deduplication system 180 include penalizing only call ends that are determined to be at fault for a failed call, while acquitting the other call end(s) of fault. Thus, accuracy of analysis results and statistics about failed calls is improved. Additionally, detection of a problem causing the failed call is improved. Since call failure rate is a high priority KPI that is carefully monitored for optimizing user experience, the improvement in accuracy and ability to resolve related problems is highly valued.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A computer implemented method to identify a call end associated with a problem that caused failure of an internet protocol-based call having first and second call ends, the method comprising:

accessing a first call detail record (CDR) set including at least one CDR associated with a first call end of the failed call;

determining from the first CDR set indicators of failure attribution of the failed call;

determining whether fault for failure of the failed call is attributed to the first call end based on the indicators of failure attribution;

outputting an indication that the fault is attributed to the first call end if it was determined that the fault is attributed to the first call end;

outputting the indication to indicate the first call end is acquitted of the fault if it was determined the fault is not attributed to the first call end;

accessing a second CDR set including at least one CDR associated with a second call end of the failed call;

correlating the first and seconds CDR sets as being associated with the failed call;

determining from the second CDR set indicators of failure attribution of the failed call;

determining whether fault is attributed to the first call end or the second call end based on the indicators of failure attribution associated with the first and second CDR sets;

outputting an indication of one of the first and second call ends of the two first and second call ends determined to be attributed with the fault for failure of the failed call; and outputting an indication to indicate the other of the first and second call ends is acquitted of the fault for failure of the failed call; and accessing a configurable failure ranking, wherein determining whether the fault is attributed to the first call end or the second call end is further based on relative failure ranking of first and second cause codes included in the indicators of failure attribution.

2. The computer implemented method of claim 1, wherein the indicators of failure attribution include at least one of a direction of a call termination message, a cause code, and indication the failed call ended unexpectedly.

3. The computer implemented method of claim 2, wherein the cause codes include at least one of defined by a protocol and inferred cause codes.

4. The computer implemented method of claim 1, further comprising determining call performance data from the first and second CDR set, wherein determining whether the fault is attributed to the first call end or the second call end is further based on the call performance data.

5. The computer implemented method of claim 4, wherein the call performance data includes at least one of: mean opinion score, packet loss, and jitter, and a quality of experience measurement, including at least one of gap count, gap length, and gap duration ratio, and one-way media delay of one or more of the uplink and downlink on one or more media path legs.

6. The computer implemented method of claim 1, further comprising, when the failure rankings of the first and second cause codes are equivalent, determining call performance data from the first and second CDR sets, wherein determining whether the fault is attributed to the first call end or the second call end is further based on the call performance data.

7. The computer implemented method of claim 1, wherein correlating the first and second CDRs includes at least one of:

using session initiation protocol (SIP) signaling parameters included in SIP CDRs of the first and second CDRs to match a calling number, which indicates a phone number of an originator call end of the first and second call ends to a called number, which indicates a phone number of a terminating call end of the first and second call ends;

using the SIP signaling parameters and real-time transport protocol (RTP) signaling parameters to match an originating RTP CDR of the first and second CDRs to an originating SIP CDR of the first and second CDRs;

using the SIP and RTP signaling parameters to match a terminating RTP CDR of the first and second CDRs to a terminating SIP CDR of the first and second CDRs;

using the RTP signaling parameters to match an RTP CDR of the first and second CDRs associated with the originator call end to an RTP CDR of the first and second CDRs associated with the terminating call end by determining whether a mobile originating uplink synchronous source identifier (SSRC)=mobile terminating downlink SSRC, and determining whether a mobile originating downlink SSRC=mobile terminating uplink SSRC; and using at least one of the SIP and RTP signaling parameters to determine whether the first and second CDR sets use different international mobile subscriber identities (IMSIs); and using at least one of SIP and RTP signaling parameters to determine whether a difference between start times for the failed call indicated in the first and second CDR sets is less than a predetermined time period.

8. The computer implemented method of claim 1, wherein the CDR set includes SIP CDRs and RTP CDRs.

9. The computer implemented method of claim 1, further comprising determining call performance data including at least one of: mean opinion score, packet loss, and jitter, and a quality of experience measurement, including at least one of gap count, gap length, and gap duration ratio, and one-way media delay of one or more of the uplink and downlink on one or more media path legs.

10. A system to identify a call end associated with a problem that caused failure of an internet protocol-based call having first and second call ends, the system comprising:
   a memory configured to store instructions;
   a processor disposed in communication with the memory, wherein the processor upon execution of the instructions is configured to:
      access a first call detail record (CDR) set including at least one CDR associated with a first call end of the failed call;
      determine from the first CDR set indicators of failure attribution of the failed call;
      determine whether fault for failure of the failed call is attributed to the first call end based on the indicators of failure attribution;
      output an indication that the fault is attributed to the first call end if it was determined that the fault is attributed to the first call end;
      output the indication to indicate the first call end is acquitted of the fault if it was determined the fault is not attributed to the first call end; and
      access a configurable failure ranking, wherein determining whether the fault is attributed to the first call end or the second call end is further based on relative failure rankings of first and second cause codes included in the indicators of failure attribution.

11. The system of claim 10, wherein the processor, upon execution of the instructions, is further configured to:
   access a second CDR set including at least one CDR associated with a second call end of the failed call;
   correlate the first and seconds CDR sets as being associated with the failed call;
   determine from the second CDR set indicators of failure attribution of the failed call;
   determine whether fault is attributed to the first call end or the second call end based on the indicators of failure attribution associated with the first and second CDR sets;
      output an indication of one of the first and second call ends of the two first and second call ends determined to be attributed with the fault for failure of the failed call; and
   output an indication to indicate the other of the first and second call ends is acquitted of the fault for failure of the failed call.

12. The system of claim 10, wherein the processor, upon execution of the instructions, is further configured to, when the failure rankings of the first and second cause codes are equivalent, determine call performance data from the first CDR set and a second CDR set, wherein determining whether the fault is attributed to the first call end or the second call end is further based on the call performance data.

13. The system of claim 10, further comprising determining call performance data including at least one of: mean opinion score, packet loss, and jitter, and a quality of experience measurement, including at least one of gap count, gap length, and gap duration ratio, and one-way media delay of one or more of the uplink and downlink on one or more media path legs.

14. A non-transitory computer readable storage medium and one or more computer programs embedded therein, the computer programs comprising instructions, which when executed by a computer system, cause the computer system to:
   access a first call detail record (CDR) set including at least one CDR associated with a first call end of the failed call and a second CDR including at least one CDR associated with a second call end of the failed call;
   determine from the first CDR set indicators of failure attribution of the failed call;
   determine whether fault for failure of the failed call is attributed to the first call end based on the indicators of failure attribution;
   output an indication that the fault is attributed to the first call end if it was determined that the fault is attributed to the first call end;
   output the indication to indicate the first call end is acquitted of the fault if it was determined the fault is not attributed to the first call end; and
   determine call performance data from the first and second CDR sets when failure rankings of first and second cause codes are equivalent, wherein determining whether the fault is attributed to the first call end or the second call end is further based on the call performance data.

15. The non-transitory computer readable storage medium of claim 14, wherein the computer system, upon execution of the computer programs, is further configured to:
   access a second CDR set including at least one CDR associated with a second call end of the failed call;
   correlate the first and seconds CDR sets as being associated with the failed call;
   determine from the second CDR set indicators of failure attribution of the failed call;
   determine whether fault is attributed to the first call end or the second call end based on the indicators of failure attribution associated with the first and second CDR sets;
   output an indication of one of the first and second call ends of the two first and second call ends determined to be attributed with the fault for failure of the failed call;
   output an indication to indicate the other of the first and second call ends is acquitted of the fault for failure of the failed call.

* * * * *